(No Model.)
A. A. ATWOOD.
SEED PLANTER.
No. 290,385. Patented Dec. 18, 1883.
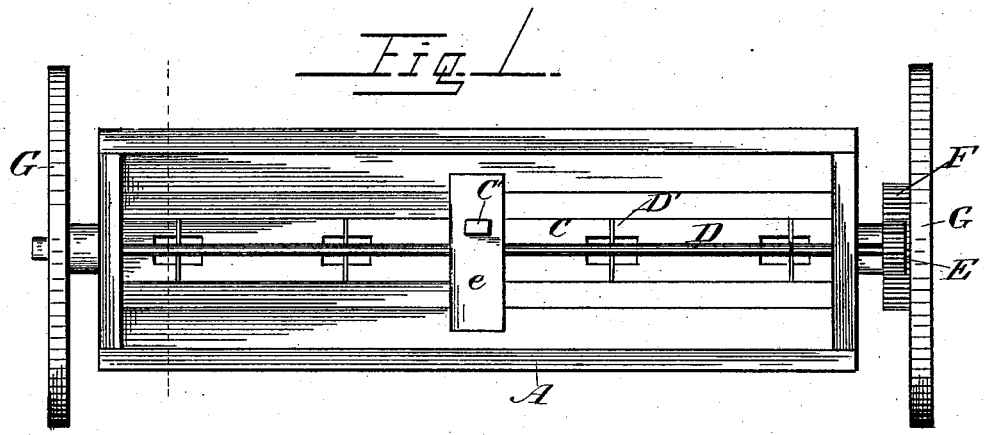
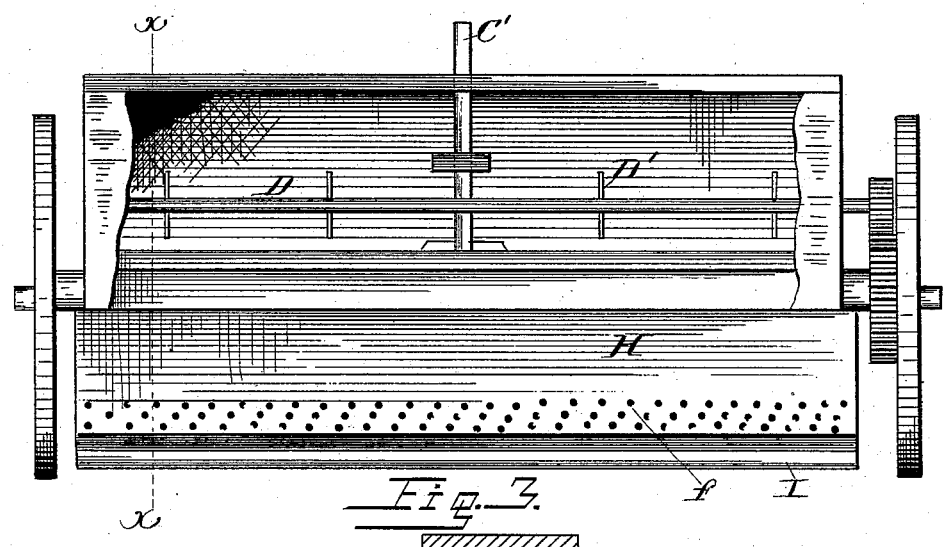
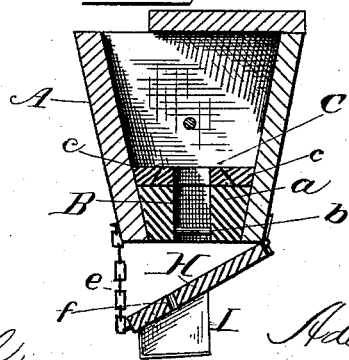
Witnesses:
Wm. S. Duvall
W. R. Hunt
Inventor:
Adelbert A. Atwood
per Edson Bro's
Attys.

UNITED STATES PATENT OFFICE.

ADELBERT ALONZO ATWOOD, OF SHENANDOAH, IOWA.

SEED-PLANTER.

SPECIFICATION forming part of Letters Patent No. 290,885, dated December 18, 1883.

Application filed July 20, 1883. (No model.)

*To all whom it may concern:*

Be it known that I, ADELBERT A. ATWOOD, a citizen of the United States, residing at Shenandoah, in the county of Page and State of Iowa, have invented certain new and useful Improvements in Seed-Planters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to improvements in seeding-machines, having for its object to cause the proper dropping of the seed, to secure compactness and simplicity of construction, and to effect the separation of different seeds; and it consists of the combination and arrangement of parts, substantially as more fully set forth and claimed.

In the accompanying drawings, Figure 1 is a plan view of my improved seeders. Fig. 2 is a front view thereof with a portion of the seed-box or hopper broken away. Fig. 3 is a cross-section on the line $x$ $x$ of Fig. 2.

In applying my invention I secure a seed hopper or box, A, upon an axle, B, in such a manner as to cause the axle to serve as its bottom entire, and provide the axle or bottom with a series of seed openings or holes, $a$, for the passage of the seed from the hopper or box.

Within the seed-openings $a$ of the seed-hopper bottom, near their lower ends, are secured cross-bars $b$, one being arranged in each opening, the function of which is to loosen the seed and prevent the choking of said openings.

Upon the hopper-bottom is arranged the seed cut-off or slide C, with its longitudinal edges adapted to fit under cleats or castings $c$ $c$, to retain the cut-off or slide in its working position. This slide is provided with seed-openings $d$, which, as the slide is operated, coincide with the openings in the axle. The cut-off C has affixed to it about midway its length a handle or hand-lever, C', reaching up through a cross-piece secured to and crosswise of the hopper A, to effect the ready operation of the cut-off.

D is the agitator-bar, having a series of radial cross pins or fingers, D', said agitator bearing in the ends of the hopper, and having that end which projects through one end of said hopper provided with a pinion, E, gearing with a larger pinion, F, on the driving or transporting wheels G on the axle-arms, to impart motion to the agitator, whereby the seed in the hopper is loosened and caused to readily drop through the openings in the hopper-bottom.

H is the seed separating and scattering board, one edge being hinged or pivoted to the lower front edge of the seed-hopper, and its rear edge suspended from the hopper by a chain or cord, $e$, Fig. 3. This board or incline has numerous apertures or holes $f$ through it, arranged near its lower rear edge, and to its under side beneath the said apertures or perforations is secured (it may be detachably) a receptacle, I, to catch the very small or grass and weed seed falling with the corn or other grain-seed upon the board H, said small seed passing through the apertures or holes $f$ in the board, and the grain-seed dropping or falling on the ground.

This machine is characteristic for compactness and simplicity of construction, and enables the proper dropping of the seed, the separation of different seeds, and the securing of the pernicious seed.

I do not limit myself to the exact form and proportion of parts composing my invention, but hold myself at liberty to make such alterations as fairly fall within the scope of my invention—as, for instance, the receiver I can be made larger or the perforations in seed-board extended farther back.

I am aware that heretofore a seed-hopper has been mounted directly upon a corrugated axle, through which corrugations seed could pass from the hopper; also, that screens have been interposed between two hoppers to clean the seed to be planted, said screens having a receiver under them which is supported upon the frame of the planter.

Having thus fully described my invention, I claim and desire to secure by Letters Patent—

1. In a seed-planter, the combination of the seed hopper or box with the axle forming the bottom thereof and inclosed by its side walls, said axle having a series of seed-openings through it, substantially as and for the purpose set forth.

2. In a seed-planter, the combination, with a seed hopper or box, of the perforated seed-board carrying a receptacle affixed to its under side, and means for raising and lowering said seed-board and its attached receptacle, substantially as and for the purpose set forth.

In testimony whereof I affix my signature in presence of two witnesses.

ADELBERT ALONZO ATWOOD.

Witnesses:
W. P. FERGUSON,
J. F. ROCKAFIELDS.